United States Patent
Frish

[15] 3,688,920
[45] Sept. 5, 1972

[54] PALLETIZING APPARATUS

[72] Inventor: William G. Frish, 302 North Ave., Watertown, Wis. 53094

[22] Filed: June 1, 1971

[21] Appl. No.: 148,525

[52] U.S. Cl. ................... 214/6 H, 187/24, 235/98 R, 235/103
[51] Int. Cl. ............................................. B65g 57/06
[58] Field of Search ....214/6 H, 6 DK, 6 P, 6 M, 6 N; 187/24, 25; 235/103 R, 98 R

[56] References Cited

UNITED STATES PATENTS

| | | | |
|---|---|---|---|
| 1,101,598 | 6/1914 | Weinke | 187/24 |
| 3,050,199 | 8/1962 | McGrath et al. | 214/6 H |
| 3,203,560 | 8/1965 | Janzer | 214/6 H |
| 3,219,203 | 11/1965 | Jeremiah | 214/6 H |
| 3,263,827 | 8/1966 | Verrinder | 214/6 P |
| 3,369,679 | 2/1968 | Buccicone | 214/6 H |
| 3,627,099 | 12/1971 | Shaffer | 214/6 H |

*Primary Examiner*—Robert J. Spar
*Attorney*—Wheeler, House & Wheeler

[57] ABSTRACT

Palletizing apparatus includes a pallet loading chamber with a pallet lift or elevator having a trunnion mounted ball nut assembly which receives a drive screw driven by an electric motor. The pallet lift and ball nut are confined against rotational motion by spaced opposed guide tracks which engage guide rollers on the lift. The drive screw motor is controlled by a digital pulse counter which is coupled to a sensor which senses screw revolutions. The pulse counter can be programmed to move the lift upward or downward a pre-selected distance such as the height of the layer of cartons. The apparatus also includes a retractable apron which is movable between an advanced position over the pallet loading chamber and a retracted position free of the loading bin by a motor driven screw and a ball nut assembly on the apron. A pallet magazine for supplying pallets to the pallet loading chamber has cam operated elevating fingers for separating the lower pallet from a vertical pallet stack and a sweep bar for moving the lower pallet into the loading chamber. The apparatus also includes a conveyor assembly with a pivoted conveyor extension and a cross conveyor at the end of the extension to afford positioning of two loaded pallets for access by fork lift trucks.

13 Claims, 17 Drawing Figures

Patented Sept. 5, 1972

Inventor
William G. Frish
By Wheler, House & Wheler
Attorneys

Fig. 14

Inventor
William G. Frish
By Whalen, Howse & Whalen
Attorneys

Patented Sept. 5, 1972

Inventor
William G. Irish
By
Wheeler, House & Wheeler
Attorneys

PALLETIZING APPARATUS

BACKGROUND OF INVENTION

Difficulty is encountered in prior art palletizing apparatus in automatically lowering a pallet lift the desired increment for each pallet layer prior to depositing the succeeding layer particularly where the containers being palletized have open flaps. Prior art palletizing apparatus generally includes hydraulic or pneumatic motors with suitable valving as well as various electrical components involving considerable expense in manufacture.

SUMMARY OF INVENTION

The invention provides apparatus for palletizing containers in which hydraulics and pneumatics are eliminated and in which a vertically reciprocal pallet lift with a cantilevered pallet fork is guided for movement by spaced opposed U-shaped channels which serve as guide tracks for guide wheels on the pallet lift frame. Movement of the pallet lift is afforded by a motor driven screw which threadably engages a trunnion mounted ball nut assembly in the pallet lift. The trunnion mounting minimizes alignment and wear problems with the screw. Energization of the screw motor and the position of the fork lift is controlled by a digital pulse counter which is coupled to a sensor which counts fractional screw revolutions. The pulse counter can be programmed to move the pallet lift downwardly a distance increment equal to the height of the containers being palletized. A return upward movement can also be programmed on the pulse counter to move the pallet upwardly a distance sufficient to contact a pattern forming apron to compress open flaps on the cartons.

The apparatus also includes a main conveyor section which forms the floor of the pallet chamber and has driven rollers spaced by gaps which receive the tines on the pallet fork and permit the fork to recess below the driven rollers to pick up empty pallets and deposit loaded pallets on the conveyor. An extension conveyor has one end pivoted adjacent the discharge end of the main conveyor and a remote end supported on a motor driven cam. A cross conveyor extends transverse to the remote end of the extension conveyor. Gaps in the extension conveyor permit the remote end to be lowered so that spaced driven endless chains located in the gaps engage the undersurface of a pallet and move the pallet onto the cross conveyor. Two loaded pallets can thus be positioned in an access position for pick-up by fork lift trucks.

The palletizing apparatus of the invention also includes a pallet magazine which supplies pallets to the pallet loading chamber. Cam controlled pallet elevating fingers raise the stack of pallets to free the lowermost pallet which is pushed into the pallet loading chamber by a pusher bar connected to spaced endless chains.

The control circuit has provision for automatic operational sequence as well as manual or step by step operation.

Further objects and advantages of the present invention will become apparent from the following disclosure.

DETAILED DESCRIPTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

PALLET LOADING CHAMBER

Figures 1, 16:
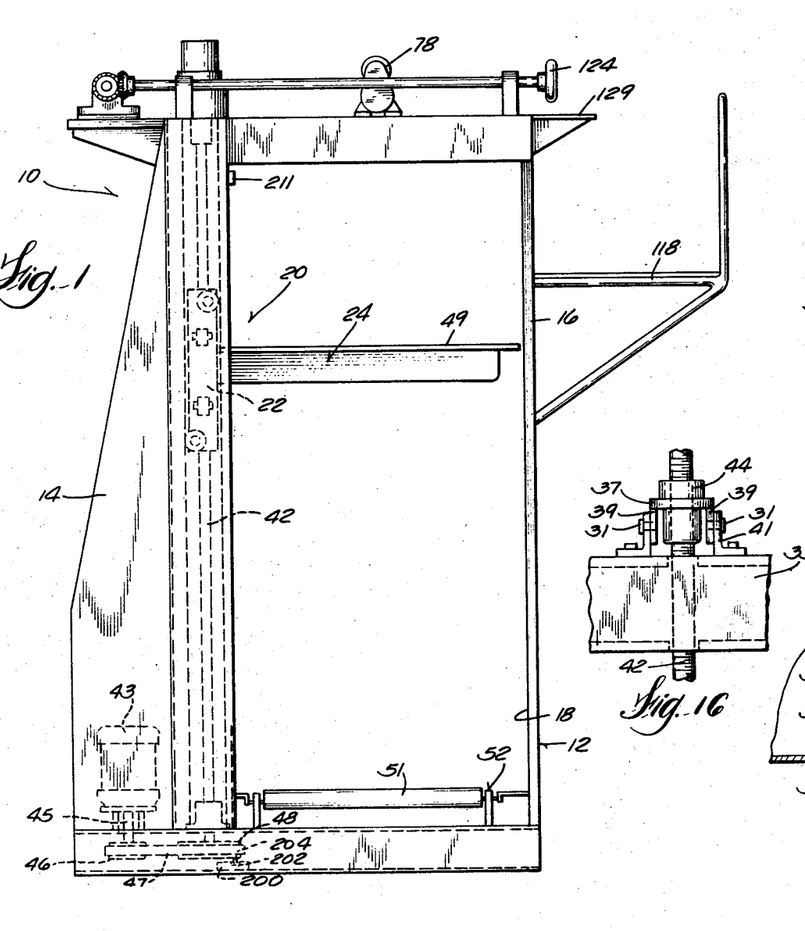
FIG. 1 is an end elevational view of the pallet loading chamber of the invention.
FIG. 16 is a view of the pallet lift along line 16—16 of FIG. 2 showing the trunnion mounting of the ball nut assembly.
Figures 2, 3:
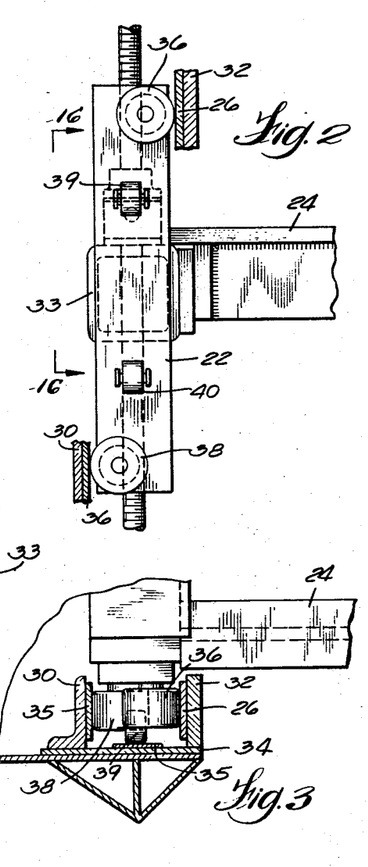
FIG. 2 is an enlarged fragmentary view of the pallet lift shown in FIG. 1.
FIG. 3 is a fragmentary plan view of the pallet lift shown in FIG. 2.
Figures 4, 5:
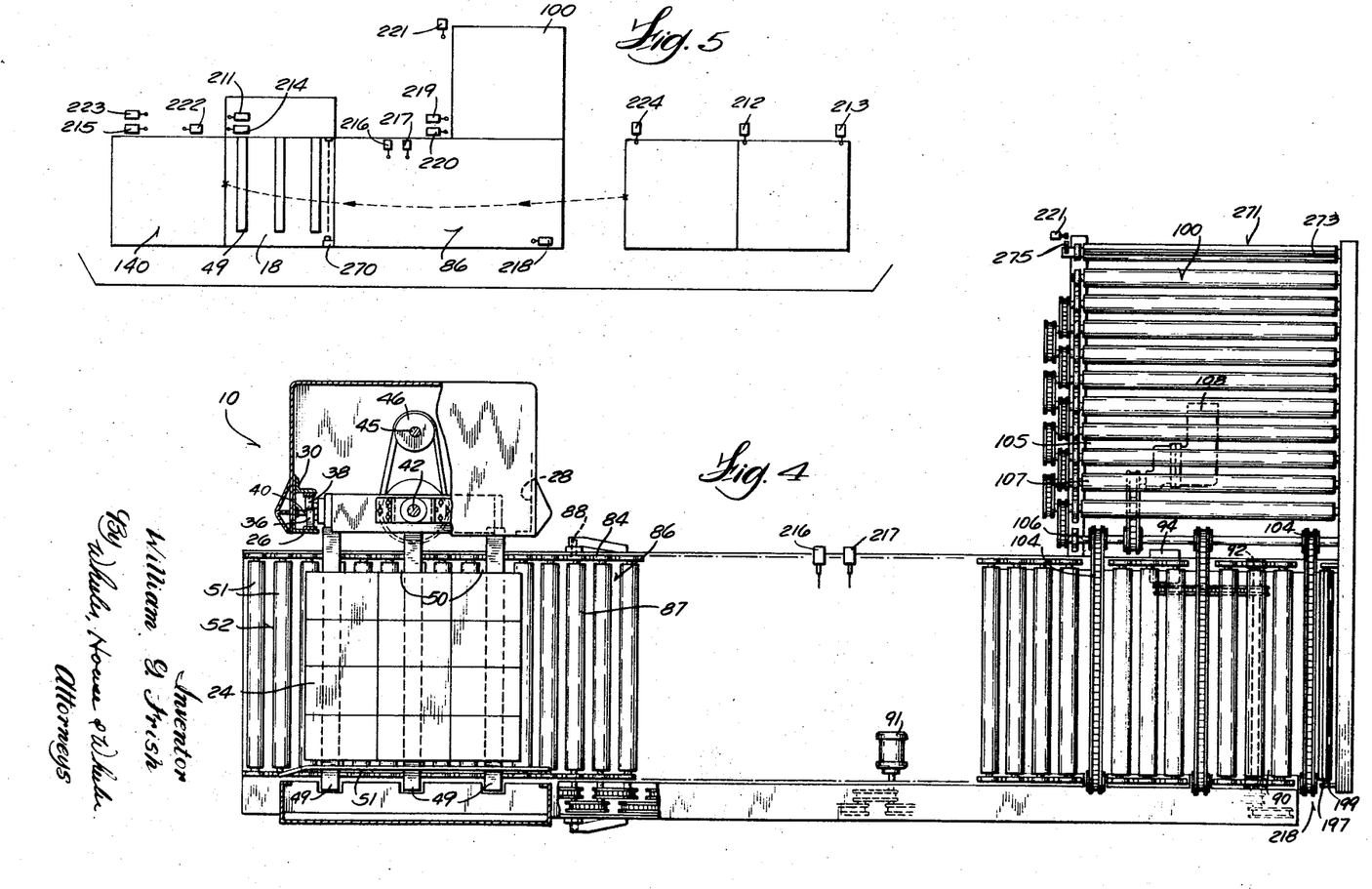
FIG. 4 is a plan view of the palletizing apparatus of the invention with portions removed and showing the main conveyor, the conveyor extension and the cross conveyor.
FIG. 5 is a schematic plan view of the palletizing apparatus shown in FIG. 4 with the pattern forming apron offset to the right.

FIG. 1 discloses the palletizing apparatus of the invention which is generally designated 10 and includes a frame 12 with a vertical mast portion 14. An opposed vertical frame portion 16 spaced from the mast 14 cooperates with the mast 14 to define a pallet loading chamber 18. The pallet chamber 18 includes a pallet lift 20 which has a frame 22 and a pallet fork 24 cantilevered from the frame 22. Means are provided for guiding the pallet lift 20 for vertical movement. In the disclosed construction, the means comprises two spaced U-shaped guide channels 26 and 28 (FIGS. 2, 3, 4)

The guide channels 26, 28 have opposed side walls 30 and 32 which are interconnected by a web 34. Wear strips 35 on the side walls 30, 32 engage horizontally offset guide rollers 36 and 38 rotatably carried on both sides of the lift frame 22. The lift frame 22 also carries two sets of guide rollers 39 and 40 which rotate about axes transverse or at right angles to the axes of rollers 36, 38 and engage the wear strips 35 on the webs 34. The two sets of rollers on each side of the pallet lift frame 22 thus confine the pallet fork against rotational movement, and afford recti-linear vertical movement.

Means are provided for raising and lowering the pallet lift 20. As disclosed, the means includes a drive screw 42 which is threadably received in a ball nut assembly 44 (FIG. 4, 16) on the pallet lift frame 22. Means are provided for supporting the ball nut assembly 44. In the disclosed construction, the means comprises a bracket 37 with depending legs 39 which interfit between upstanding tabs 41 on a box beam 33 which forms part of the pallet lift frame 22. Trunnions 31 support the ball nut assembly 44 for movement about a horizontal axis to minimize wear and alignment problems with the drive screw 42 (FIG. 16).

Means are provided for rotating the screw 42 to afford upward and downward movement of the pallet lift 20. In the disclosed construction, the means includes an electric motor 43 (FIG. 1) having an output shaft 45 with a pulley 46. An endless belt 47 is reeved on pulley 46 and drivingly engages pulley 48 which is fixed to the screw 42. The pallet fork 24 is movable into a retracted position or lowermost position in which the fork tines 49 are recessed within gaps 50 between the conveyor rollers 51 (FIG. 4) in the main conveyor 52 which forms the floor of the pallet loading chamber 18.

RETRACTABLE PATTERN FORMING APRON

Figure 7:
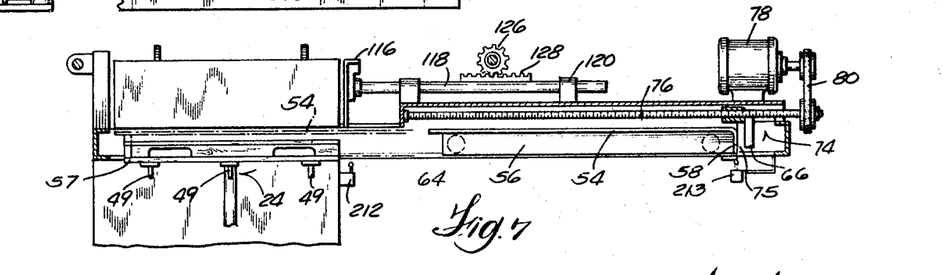
FIG. 7 is a fragmentary side elevational view of the palletizing apparatus shown in FIG. 6.

The uppermost position of the pallet fork 24 is shown in FIG. 7 in which a pallet 57 is located beneath a retractable apron or slide plate 54. The retractable apron 54 is movable between an advanced position over the pallet loading chamber 18, (shown in broken lines in FIG. 7) and a retracted position.

Figure 8:
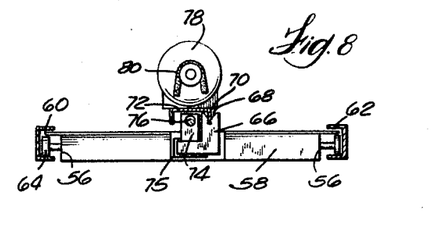
FIG. 8 is a fragmentary end view of the apparatus shown in FIG. 7.

Means are provided for moving the retractable apron 54 between the advanced and retracted positions. In this regard, the retractable apron 54 has depending side rails 56 and a depending end rail 58 (FIGS. 7, 8). The apron 54 is supported by spaced inwardly open guide channel members 60 and 62 which receive guide wheels or rollers 64 rotatably supported on the side rails 56. The guide channels 60 and 62 are cantilevered from the frame 12 and extend along the upper edges of the pallet loading chamber 18 and away from the pallet loading chamber a distance sufficient to afford complete withdrawal of the apron 54 from the loading chamber 18. The retractable apron 54 is also guided by a nylon block 66 (FIG. 8) which has a groove 68 which receives a depending flange 70 on a downwardly open channel member 72 which is connected to the main frame 12. The nylon block 66 is fixed to a bracket 75 which is connected to the end rail 58 of the retractable apron 54. A ball nut assembly 74 is also fixed to bracket 75 and receives a threaded drive screw 76 which is driven by an electric motor 78 supported on the channel member 72. A drive train 80 connects the motor output shaft to the screw 76.

CONVEYORS

Figure 9:
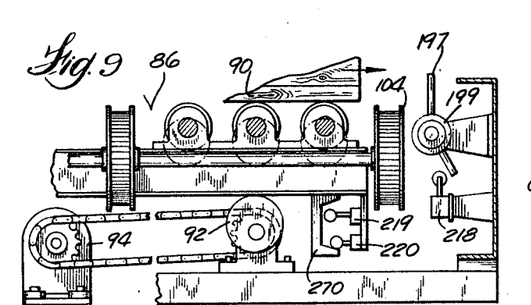
FIG. 9 is a fragmentary elevational view of the extension conveyor shown in FIG. 4.

The location of the conveyors of the palletizing apparatus 10 is best shown in FIG. 4. The main conveyor 52 extends from the pallet loading chamber 18 to an extension conveyor 86 which has its adjacent end 87 pivotally supported or hinged by pins 88 supported on the frame 12. The remote end 90 of extension conveyor 86 is supported by a cam 92 (FIG. 9) which is rotated by a motor 94 to raise and lower the remote end 90 of the extension conveyor 86 for purposes presently described. The rollers of conveyors 86 and 52 are driven by a motor 91.

The palletizing apparatus 10 also includes a cross conveyor 100 which extends transversely of the remote end 90 of the extension conveyor 86. Loaded pallets are transferred to the cross conveyor 100 by a transfer system which includes a plurality of spaced belts or chains 104 (FIG. 4) driven by a shaft 106 which is drivingly connected to 1 motor 108. The shaft 106 also drives some of the rollers 107 which form the cross conveyor 100. When the extension conveyor 86 is dropped to its lowermost position by rotation of cam 92, the chains 104 engage the pallet to convey the pallet onto the driven rollers 107 of the cross conveyor 100. Thus, two loaded pallets, one on the cross conveyor 100, and one on the end 90 of conveyor 86, can be located in a convenient access position for fork lift trucks.

PATTERN FORMING BARS

Figure 6:
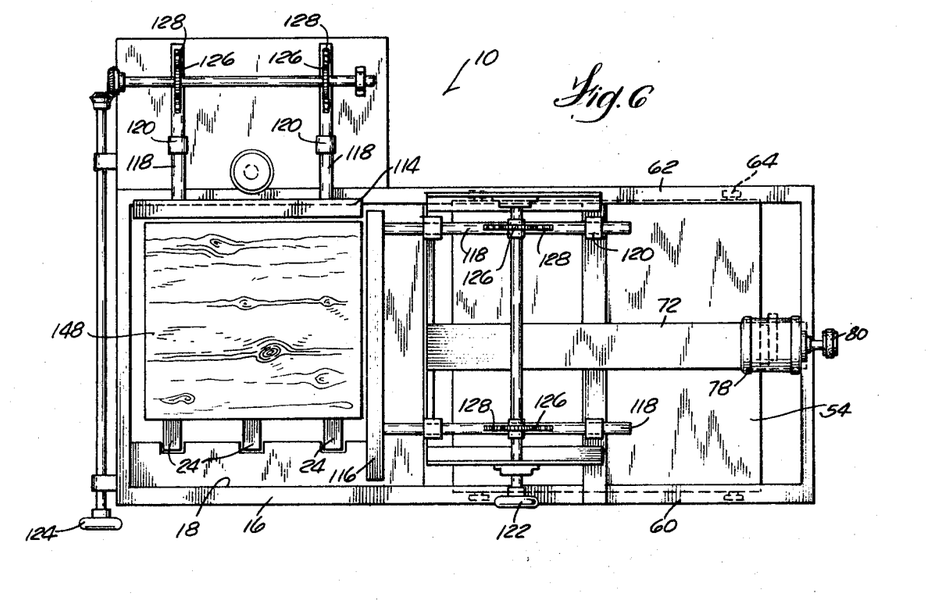
FIG. 6 is a plan view of the apparatus shown in FIG. 1.

To facilitate arranging patterns of cartons on containers at a predetermined pattern width or length, the palletizing apparatus 10 includes adjustable pattern forming bars or rails 114, 116 (FIGS. 6, 7) along the upper margins of the pallet loading chamber 18.

In this regard, the pattern forming bars 114 and 116 are connected to posts 118 which are reciprocal in guide blocks 120. Lateral adjustment of the side rails 114 and 116 is afforded by cranks 122 and 124 which are connected to the posts 118 by sprockets 126 which engage racks or links of sprocket chain 128 which are welded or otherwise affixed to the posts 118. The pattern forming bars 114 and 116 are easily adjusted by the operator on the operator stand 118 (FIG. 1). The containers to be palletized are delivered to a loading plate 129 by a supply conveyor (not shown). The operator moves the containers from the loading plate 129 unto the apron 54 and arranges the containers in the desired pattern between the pattern forming bars 114, 116.

PALLET MAGAZINE

Figure 11:
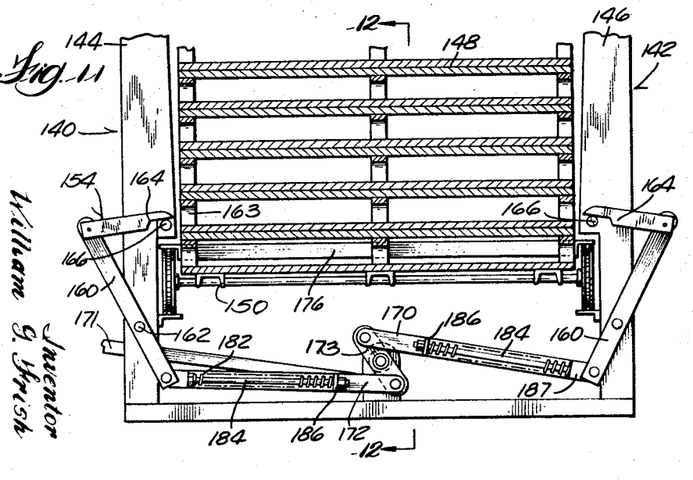
FIG. 11 is a view similar to FIG. 10 with the elevating fingers in a retracted position.
Figure 12:
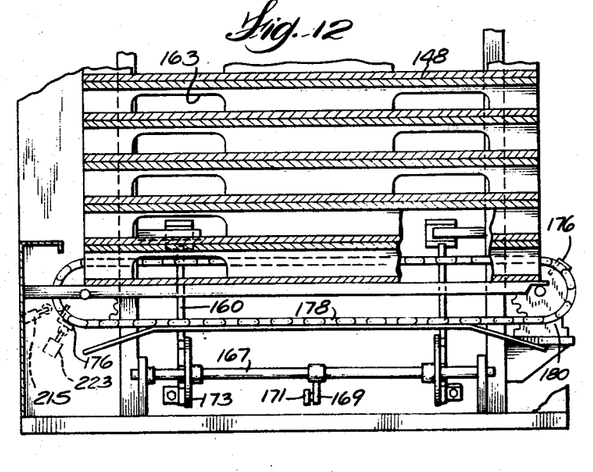
FIG. 12 is a sectional view along lines 12—12 of FIG. 11.
Figure 13:
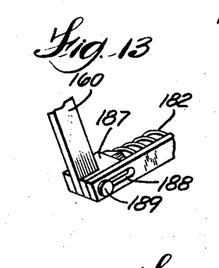
FIG. 13 is a fragmentary perspective view of the elevating finger drive linkage.

The invention also includes a pallet magazine or dispenser 140 (FIGS. 10, 11, 12) which is located adjacent to the pallet loading chamber 18 (FIG. 5) and supplies pallets to the loading chamber 18 in an automated cycle as presently described. The pallet magazine 140 includes a frame 142 with opposed side walls 144 and 146. The magazine 140 carries a complement of pallets 148 in a vertical stack which is supported by lower frame members 150.

Means are provided for separating the pallet stack from the lower pallet to facilitate discharge of the lower pallet into the pallet loading chamber 18. As disclosed, the means comprises spaced pairs 154 of elevating fingers 155 located on each side of the pallet magazine 140. The fingers 155 project through openings in the side walls 144 and 146 and are pivoted to arms 160 which are pivotally connected to the frame 142 by pins 162. Means are provided to afford generally horizontal inward movement of the fingers 155 (FIG. 11) a predetermined distance to register the fingers 155 in the pallet notches or slots 163 and thence movement in an upwardly inclined direction (FIG. 10) to separate the stack 148 of pallets from the lower pallet 174. In the disclosed construction the means comprises cam surfaces 164 on the fingers and cam followers 166 on the frame.

The fingers 155 are moved by a motor 168 which reciprocates a link 171 which is connected to a crank 169 on a rock shaft 167. The rock shaft 167 is connected to cranks 173 which are connected to pairs of links 170 and 172, which are connected to the ends of the arms 160.

To prevent damage to the motor 168 and the linkages connected thereto, the links 170 and 172 can be spring loaded with springs 182. The inner ends of rods 184 are fixed to tabs 186 on the links 170, 172. The outer ends of rods 184 are fixed to U-shaped brackets 187 which are pinned to the arms 160 by pins 189. Nuts 183 can be threaded on rods 184 to adjust tension on the springs 182. The links 170, 172 have slots 188 which receive the pins 189. If the pallet fingers 155 do not register in the pallet loading notches, the springs yield as the pins 189 slide in the slots 188.

When the pallet stack is separated from the lower pallet 174, the lower pallet 174 is pushed into the loading chamber 18 by push bars 176 which are connected to spaced endless chains 178, which are driven by a motor 180.

Figure 17:
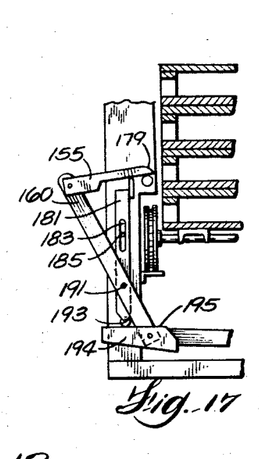
FIG. 17 is a fragmentary view of the pallet magazine similar to FIG. 10 and showing a modified embodiment of the pallet elevating finger assembly.

FIG. 17 shows a modified embodiment of the pallet elevating lift assembly. To facilitate lifting of the stack of pallets 148 if the fingers 155 do not register in the slots 163, lift bars 181 are provided. The lift bars 181 are guided for vertical movement by a lift bar slots 183 which receive pins 185 on the frame. The lift bars 181 are also connected by pins 191 to the arms 160. The upper ends of the lift bars 181 engage the undersurfaces of the fingers 155. Rollers or cam followers 193 on the lower ends of the lift bars 181 engage cam surfaces 195 on plates 194 connected to arms 160. When the fingers 155 hit the sides of a pallet continued travel of the links 170, 172 as the springs 182 yield causes the rollers 193 to ride upwardly on the cam surfaces 195 to raise the lift bars 181, the fingers 155 and thus the pallet stack. The tips 179 of the fingers 155 can be provided with a friction surface to facilitate lifting of the pallets.

CONTROL CIRCUIT

Figure 14:
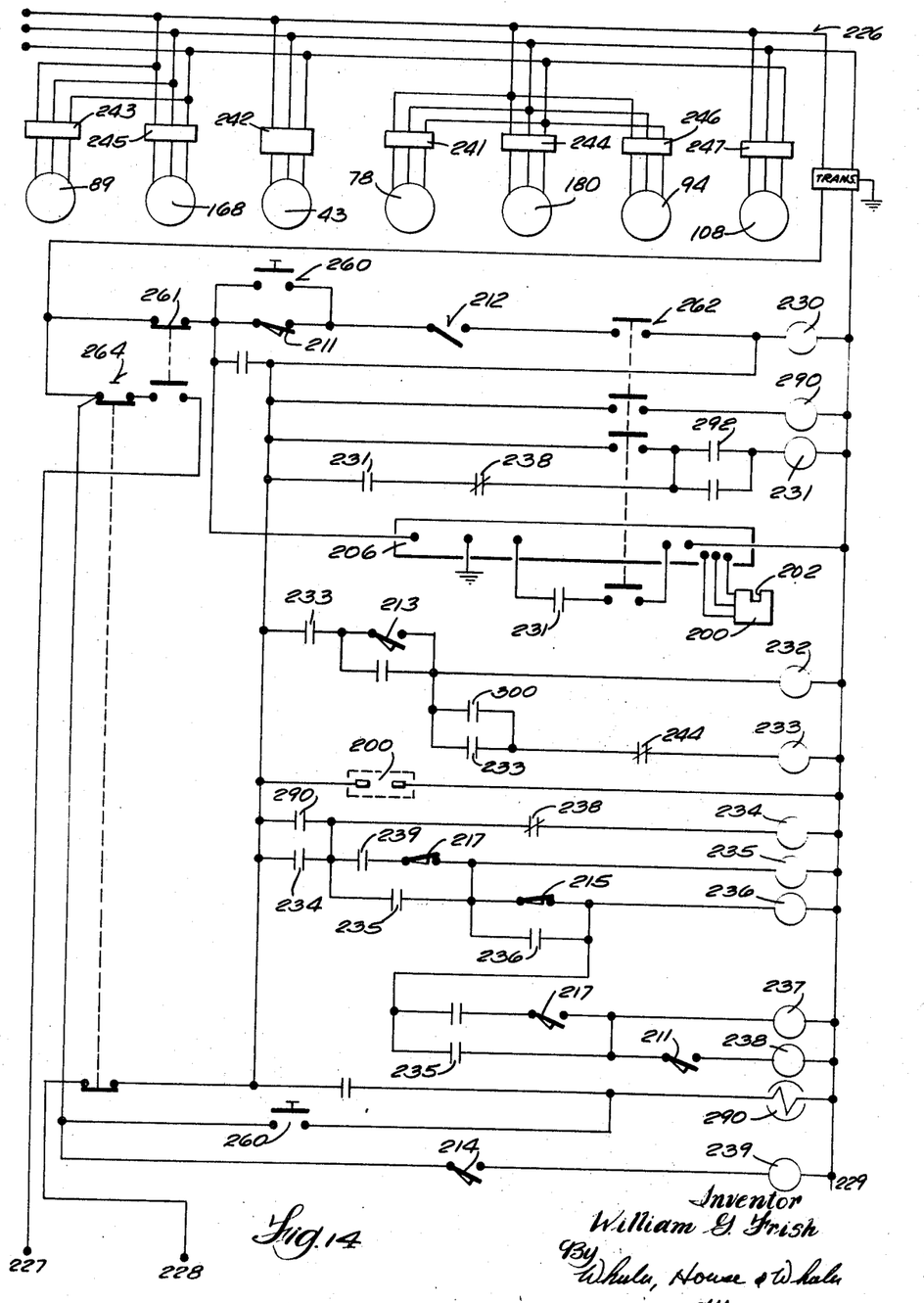
FIG. 14 is a schematic diagram of a portion of the electrical circuit of the palletizing apparatus of the invention.

The invention provides means for counting fractional revolutions of the screw 42 to lower the pallet lift fork 24 the appropriate increment below the apron 54 for each container layer. The means includes a photo-cell sensor 200 (FIGS. 1, 14) which has a slot 202 which receives four depending tabs 204 located on the periphery of a screw drive pulley 48. The tabs 204 are spaced at 90 degrees. When the tabs 204 intercept the light beam across the slot, a pulse is transmitted to a pulse counter 206 (FIG. 14). The pulse counter 206 can be a Dynapar 500H digital process controller sold by the Louis Allis Company. The digital pulse counter 206 has controls for presetting or programming vertical travel of the fork in either a downward or upward direction at a selected number of inches of travel. If the height of the containers being palletized is, for instance, 8 inches, the dials on the pulse counter 206 are preset to lower the pallet fork eight inches subsequent to deposition of each layer. If cartons with four inch open flaps are being palletized, the pulse counter 206 is preset for twelve inch downward movement so that the retractable apron can be repositioned over the pallet loading chamber 18 after it is withdrawn from beneath a patterned layer to deposit the layer on the pallet carried by the pallet fork 24. The pulse counter 206 can also be programmed to provide a return upward movement of the fork 24 of, for instance, four inches to compress the carton flaps against the underside of the apron 54. Thus, the next layer of cartons deposited, maintains the carton flaps on the lower layer in the compressed state.

The control circuit includes various limit switches for energizing and de-energizing the various palletizing machine components in the proper sequence. The location of the various limit switches is diagrammatically shown in FIG. 5. The limit switch 211 is positioned at the top of the pallet loading chamber 18 and trips to de-energize the motor 43 when the pallet fork 24 is in the full up position just below the apron 54. The limit switch 212 is engage by the apron 54 to de-energize the motor 78 when the apron 54 is in the advanced position enclosing the loading chamber 18. The limit switch 213 is tripped by the apron 54 to de-energize motor 78 when the apron 54 is in a fully retracted position. The limit switch 214 is in the pallet loading chamber 18, at the bottom of travel of the fork 24 and is tripped by the fork 24 to de-energize motor 43 when the fork 24 is in a full down position recessed in the conveyor 52. Limit switches 215 and 223 are located on the frame of the pallet magazine (FIG. 2) and engaged by the pusher bar 176 to de-energize motor 180 when the pusher bar 176 has completed a cycle and ejected a pallet into the pallet loading chamber 18. The limit switches 216 and 217 are located adjacent the extension conveyor 86 and trip when engaged by pallets moving toward the end 90 of conveyor 86. Limit switch 218 is engaged by an elongated tab 197 on a rock shaft 199 at the remote end of extension conveyor 86. When pallets reach the end of the extension conveyor, they engage the tab 197 which rotates the rock shaft 199 to actuate limit switch 218 which interrupts power flow to the rollers on the extension conveyor 86.

The limit switches 219 and 220 are engaged by a bracket 270 (FIG. 9) connected to the conveyor 86 as the conveyor 86 is raised and lowered by the cam 92 as subsequently described. The limit switch 221 is located adjacent the end of the cross conveyor (FIG. 4). A rock shaft 271 at the end of the cross conveyor has a tab 273 which contacts a pallet. A cam 275 on the end of the rock shaft engages the limit switch 221.

Figure 10:
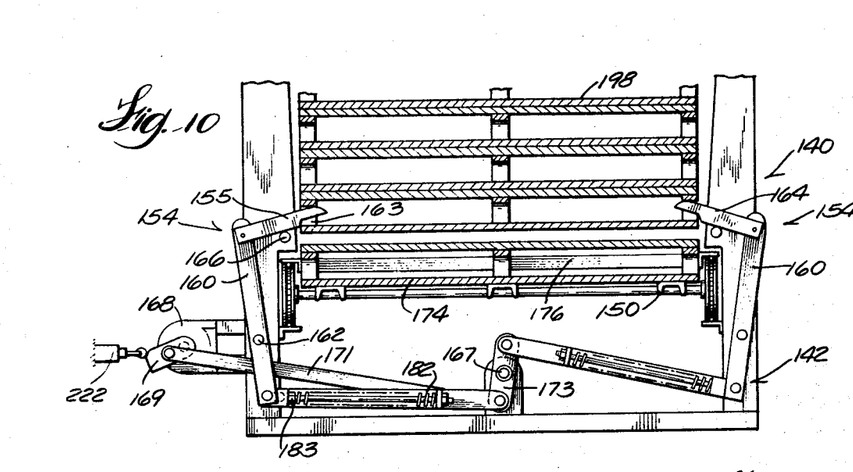
FIG. 10 is a fragmentary end view of the pallet magazine with the elevating fingers in the advanced position supporting a stack of pallets.

The limit switch 222 is controlled by a cam 169 on the output shaft of the elevating finger motor 168 (FIG. 10). The limit switch 224 is located above the path of travel of the apron 54 and trips when a pallet strikes the undersurface of the apron 54 and slightly lifts the apron 54.

Figure 15:
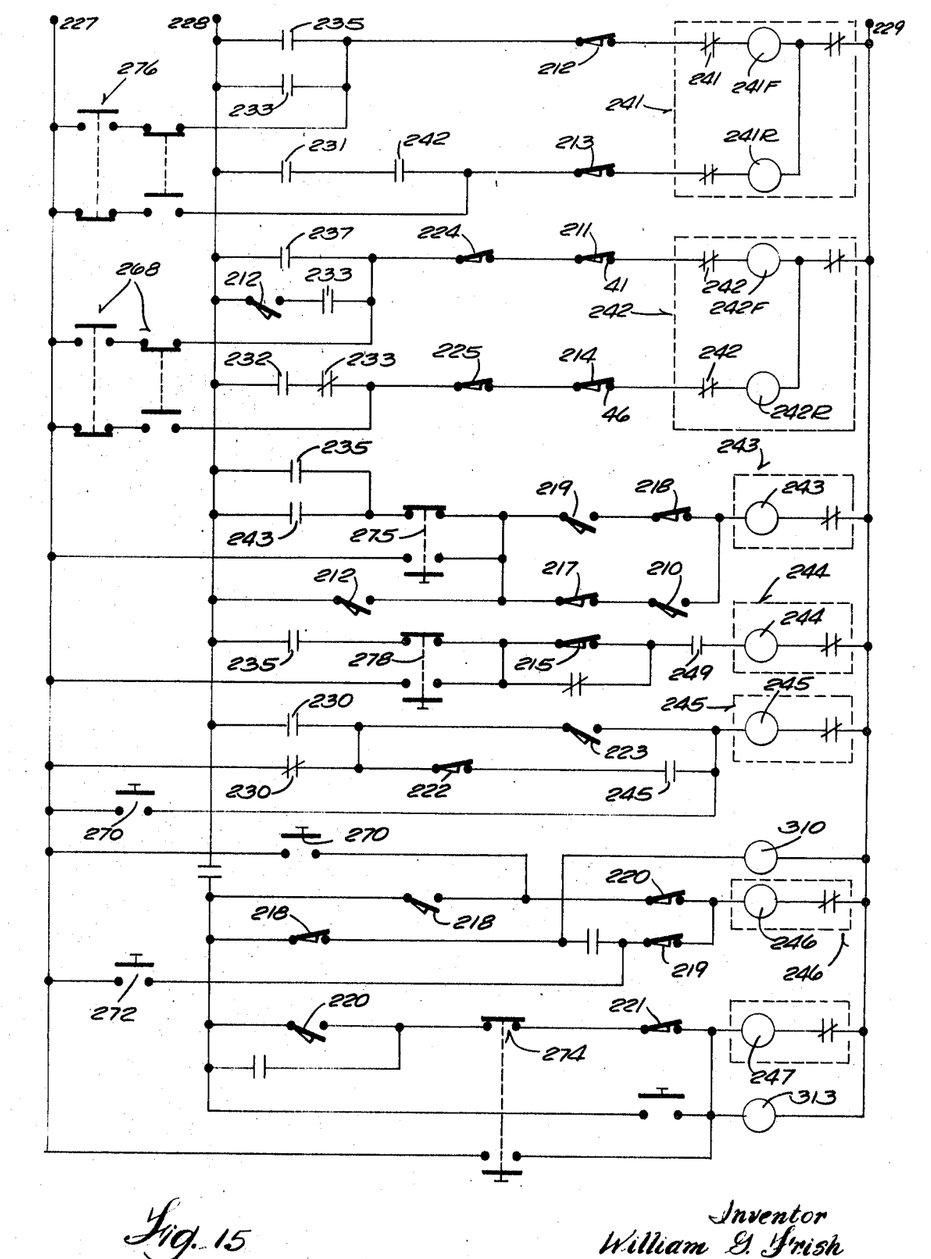
FIG. 15 is a schematic diagram of a portion of the electrical circuit which is coupled to the circuit shown in FIG. 14.

The circuit stage shown in FIG. 14 is coupled to the circuit stage shown in FIG. 15 by terminals 227, 228 and 229 to form a circuit 226 which various includes control relays and motor control relays.

The operator's console located adjacent the operator's platform is provided with a selector switch 261 for automatic cycling or manual operation, an automatic reset switch 260 to set the circuit for the automatic sequence, an index switch 262, an emergency stop switch 264, and a retractable apron switch 266. The console also includes a fork lift switch 268, a switch 270 for actuating the motor which energizes the motor to raise and lower the extension conveyor 86 and a switch 274 to energize the cross conveyor motor.

The console also includes a switch 275 for energizing the motor 91 to activate the conveyors 52 and 86. A switch 276 controls the motor 78 for the apron 54. A switch 278 controls the motor 180 for the pallet dispenser.

OPERATION

In operation of the palletizing apparatus, an empty pallet is placed in the pallet loading chamber beneath the apron 54 by actuating the switch 270 to raise the elevating fingers and free the lower pallet from the pallet stack. Next the switch 278 is actuated to energize the motor 180 and move the chains 178 to deliver a pallet to the loading chamber 18. The main conveyor drive switch 275 is next actuated to position the empty pallet on the pallet fork. Switch 268 is then closed to raise the pallet. When the apron 54 is in the closed position over the pallet loading chamber 18, the operator places the cartons in the desired pattern upon the apron 54. If the switch 261 is set for automatic operation, the operator then presses the index button 262 which energizes a counter 290 to advance the count one position. Since the apron 54 is in the advanced position over the loading bin, the limit switch 213 is closed, thus allowing power to be applied to the motor starter 241 to energize motor 78 and retract the apron 54 to the full retracted position causing limit switch 213 to be engaged and opened to stop the motor 78. As limit switch 213 is engaged, other contacts for switch 213 close and energize the relay 232 which results in energization of motor control relay 242 to operate the motor 43 for the pallet lift 20. The pallet lift 20 lowers until it reaches the distance programmed on the counter 206. Upon reaching the preset distance, contacts 300 close, the relay 233 is energized, and the normally closed contacts 233 open and de-energize the motor 43. The normally open contacts 233 close and energize the motor 78 to move the retractable apron to the advanced position over the pallet loading chamber 18. The limit switch 212 is engaged by the apron 54 when in the advanced position and the normally open contacts for limit switch 212 are closed energizing the motor relay 242 F and the pallet lift motor 43, causing the motor 43 to raise the pallet lift 20, the preset distance on the counter 206. When the pallet lift 20 has traveled upwardly the preselected distance, contact 292 will open de-energizing relay 231 and opening all contacts for relay 231 and interrupting upward movement of the pallet lift 20. If the cartons have open flaps, the pallet lift 20 is lowered a distance sufficient for the apron to clear the flaps when the apron 54 returns to the closed position. The return upward movement of the lift is programed to move against the undersurface of the apron 54 to compress the flaps and receive the next patterned layer of cartons when the apron is again withdrawn to deposit the subsequent layer.

After the operator loads a second pattern layer on the apron 54, the index button 262 is actuated to continue the pallet loading sequence. When the selected number of layers is deposited on the pallet, the layer counter 290 will cause the pallet lift 20 to lower to its full down position where it actuates the limit switch 214 at the bottom of the pallet loading chamber 18 to stop the pallet lift 20.

As the pallet lift 20 recesses in the main conveyor 52, the pallet is conveyed by the main conveyor 52 to the extension conveyor 86. The conveyors 52, 86 are operating when the extension conveyor 86 is in the full up position, (FIG. 9) because the limit switch 219 is closed and power is applied to motor relay 243 to energize the motor 91 for the main conveyor 52 and the extension conveyors 86. When a full pallet moves from the loading chamber 18, the pallet engages and closes the limit switch 216 located along the extension conveyor 86. When the switch 216 is engaged, it causes power flow to the motor 180 in the pallet magazine.

As the motor 180 moves the chains 178 (FIG. 12) a short distance, the sweep bar 176 moves from limit switch 223 (FIG. 12) to close switch 223 and engages and closes the limit switch 215. The chains 178 will continue movement until the second sweep bar 176 engages the limit switch 215 as a cycle is completed with one pallet ejected. When the sweep bar 176 leaves the switch 215, the intermittent actuation will energize relay coil 245 to cause power to be applied to the elevating finger motor 168 to raise the stack of pallets and free the lower pallet. The limit switch 222 will close as soon as the motor 168 is energized and remain closed until the motor 168 rotates the cam 169 one revolution and de-energizes the relay coil 245.

The pallet that is ejected from the pallet magazine 140 into the pallet loading chamber 18 continues movement under the influence of the main conveyor 52 until it interrupts the beam of a photocell unit 270 which causes the motor 43 to be energized to raise the pallet lift 20 and the empty pallet. A loaded pallet has previously closed limit switch 217 (FIG. 4) which completes the circuit to motor 43.

The main conveyor continues running until the previously loaded pallet reaches the end 90 of the extension conveyor 86 and hits the tab 197 (FIG. 4) to engage limit switch 218. This stops the main conveyor 54 and the extension conveyor 86 by de-energizing relay 243 and thus, the main conveyor motor 91.

With the extension conveyor 86 in the up position, the limit switch 220 is closed (FIG. 9) and power is supplied to the motor 94, causing the extension conveyor 86 to lower to the full down position and close limit switch 219. Limit switch 221 is open and causes power to be supplied to motor 108 which commences movement of the chains 104 and the rollers of cross conveyor 100 to move a loaded pallet from the extension conveyor 86 unto the cross conveyor 100. As the pallet leaves the extension conveyor 86, the limit switch 218 is released. As switch 218 is opened, a timer 310 is engaged and after a preselected delay closes the circuit causing the motor 94 to raise the extension conveyor 86. When the pallet comes in contact with the tab 273 on rock shaft 271 to actuate the limit switch 221, which causes the coils 247 and 233 to be de-energized. The loaded pallet is then in an access position on the cross conveyor 100.

With one pallet on the cross conveyor and a second loaded pallet on the end 90 of the extension conveyor, both the limit switches 221 and 218 will be actuated to energize the timer coils 246 and 313 when the loaded pallets are picked up by fork lift trucks. When the timer 246 times out, it will cause the extension conveyor to rise by applying power to the motor 94. As the extension conveyor 86 rises to the full up position, the limit switch 219 will stop the conveyor extension 86 in its full up position. As the conveyor 86 starts to rise, the limit switch 220 will open causing the timer 313 to be de-energized.

The main conveyor or extension conveyor 86 rollers will continue to rotate if a pallet is located on the extension conveyor and has engaged limit switch 217. This pallet will continue to the remote end 90 of the conveyor extension 86 until it makes contact or actuates limit switch 218 and thus repeats the transfer cycle onto the cross conveyor 100.

Thus, the conveyors can be loaded with a one fully loaded pallet stored on the cross conveyor 100, one fully loaded pallet stored on the end 90 of the extension conveyor 86 when the extension conveyor is in the down position, and one fully loaded pallet stored in the center of the extension conveyor. One loaded pallet can also be stored in the loading chamber 18 with the pallet lift in the full down position.

What is claimed is:

1. Palletizing apparatus comprising a frame defining a pallet loading chamber, a retractable apron for arranging articles in a pattern and depositing same on a pallet and mounted on said frame for movement to and from a position above a pallet in said pallet loading chamber, a vertically movable pallet lift for supporting a pallet in said pallet loading chamber and having a threaded member, means on said pallet lift for supporting said threaded member, a drive screw threaded into said threaded member, means for rotating said drive screw, and electrical, programmable means for counting the revolutions of said drive screw and for actuating said means for rotating said drive screw in response to said count to afford downward movement of said lift a preselected distance increment and upward return movement of said elevator a preselected distance increment, whereby said pallet lift is vertically shifted to permit the stacking of articles on a pallet resting thereon.

2. Apparatus in accordance with claim 1 wherein said means for supporting said threaded member comprises a bracket and means for supporting said bracket for movement about a horizontal axis.

3. Apparatus in accordance with claim 2 wherein said means for supporting said bracket for movement about a horizontal bracket comprises side legs on said bracket, upstanding tabs on said lift and trunnions connecting said tabs to said legs.

4. Apparatus in accordance with claim 1 wherein said means for driving said screw comprises an electrical motor and a drive train connecting said motor to said screw, and said programmable means for counting revolutions of said screw includes a sensor for sensing rotating of said screw and a pulse counter electrically coupled to said sensor and to said screw drive motor for energizing said motor to lower and raise said pallet lift the programmed preselected distance increments.

5. Apparatus in accordance with claim 1 including means for guiding movement of said pallet lift comprising spaced upstanding guide channels, each of said guide channels having three guiding surfaces and guide wheels rotatably carried on each side of said pallet lift and engaging said guiding surfaces.

6. Apparatus in accordance with claim 1 including a main conveyor supported by said frame with recesses to receive said pallet lift, an extension conveyor having one end pivotally supported on said frame adjacent said main conveyor, means for raising and lowering the remote end of said extension conveyor, a cross conveyor having an end adjacent said remote end of said extension conveyor and extending transverse to said extension conveyor, and pallet transfer means at said remote end of said extension conveyor said transfer means being engageable with pallets carried by said extension conveyor to transfer pallets to said cross conveyor upon lowering of said remote end of said extension conveyor.

7. Apparatus in accordance with claim 6 wherein said means for raising and lowering said extension conveyor comprises a motor operated cam.

8. Apparatus in accordance with claim 1 including a pallet magazine located adjacent said pallet lift chamber and having a magazine frame with upstanding side walls and a floor for supporting a stack of pallets, means for separating the stack of pallets from a lower pallet, and a pusher bar for moving the lower pallet from said pallet magazine into said pallet loading chamber.

9. Apparatus in accordance with claim 8 wherein said means for separating the stack of pallets from the lower pallet comprises, openings in said side walls, fingers on opposite sides of said side walls and projecting through said openings in said side walls, cam surfaces on said fingers and cam followers on said frame cooperating with said cam surfaces to provide initial finger movement from a retracted position in a generally horizontal plane to an advanced position in an upwardly inclined direction to raise the pallet stack, and means for moving said fingers between the retracted position and an advanced position.

10. Apparatus in accordance with claim 9 wherein said means for moving said fingers between the retracted position and the advanced position comprises a motor, a rock shaft having a drive crank, a drive link reciprocated by said motor and connected to said drive crank on said rock shaft, output cranks connected to said rock shaft, arms pivotally connected to said fingers and to said magazine frame, and links connected to said output cranks and to said arms.

11. Apparatus in accordance with claim 10 wherein said links connecting said arms to said output cranks are yieldable.

12. Apparatus in accordance with claim 10 including lift bars and means for guiding the lift bars for generally vertical movement, cam surfaces on said links and said lift bars having upper ends engaging said fingers and cam followers on the other ends of said lift bars engaging said cam surfaces to afford upward movement of said lift bars.

13. Apparatus in accordance with claim 1 including cantilevered channel members for supporting said retractable apron, depending side rails on said apron, guide wheels on said side rails, said guide wheels being supported by said channel members, a ball nut assembly on said apron, a drive screw threadably engaged with said ball nut assembly, and a motor for driving said screw to move said apron between a position enclosing said pallet loading chamber and a position clear of said loading chamber.

* * * * *